Nov. 20, 1934.　　　M. G. TORSON　　　1,981,009
ICE CREAM FREEZING DEVICE
Filed Dec. 8, 1931　　2 Sheets-Sheet 1
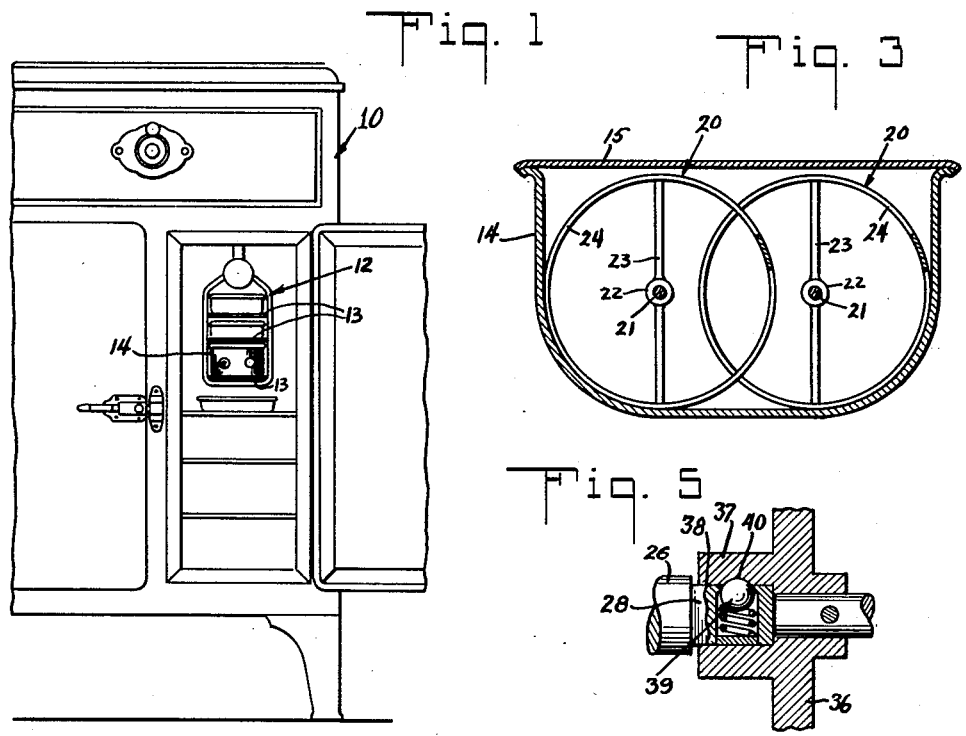
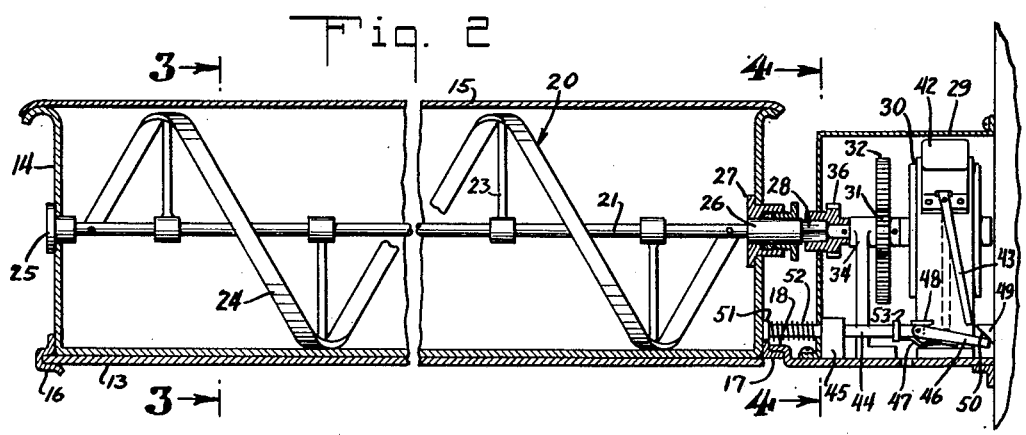
INVENTOR.
M. G. TORSON.
BY
ATTORNEY.

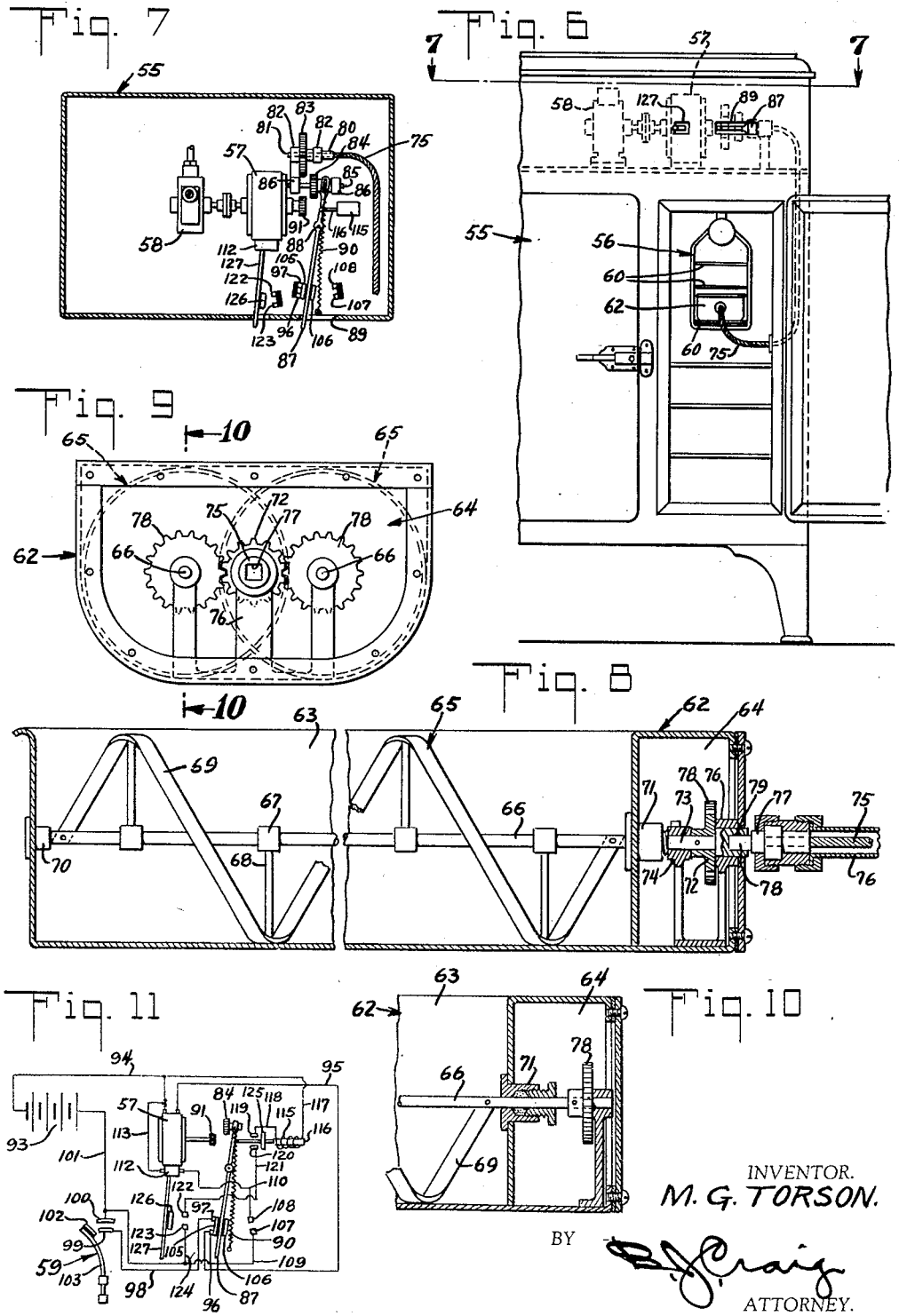

Patented Nov. 20, 1934

1,981,009

UNITED STATES PATENT OFFICE 1,981,009

ICE CREAM FREEZING DEVICE

Martin G. Torson, Kansas City, Mo.

Application December 8, 1931, Serial No. 579,734

4 Claims. (Cl. 62—116)

This invention relates to ice cream freezing devices for use in iceless refrigerators.

The general object of this invention is to provide an ice cream freezing device for use in iceless refrigerators which includes mechanically operated stirring means.

Another object of the invention is to provide a device of the class described including a container removably mounted in the freezing compartment of the refrigerator and the container including stirring means which is operated by an electric motor built in the refrigerator.

A further object of the invention is to provide a device of the class described wherein means is provided for stopping the stirring device when the substance being frozen reaches a certain viscosity.

An additional object of the invention is to provide an iceless refrigerator including a motor for operating the same, together with an ice cream freezing device which is operated by the motor which operates the refrigerating machine.

Still another object of the invention is to provide an iceless refrigerator having an ice cream freezer associated therewith, and wherein novel means is provided for enabling the motor of the refrigerating device to actuate the ice cream freezer.

Other objects of this invention will be apparent from the following description taken in connection with the accompanying drawings wherein:

Fig. 1 is a front elevation of an iceless refrigerator embodying the features of my invention.

Fig. 2 is an enlarged central sectional view through my improved ice cream freezer, showing a portion of the driving mechanism in elevation and a portion in section.

Fig. 3 is a section taken on line 3—3 of Fig. 2.

Fig. 4 is a section taken on line 4—4 of Fig. 2.

Fig. 5 is an enlarged sectional detail.

Fig. 6 is a view similar to Fig. 1, showing a modified form of my invention.

Fig. 7 is a section taken on line 7—7 of Fig. 6.

Fig. 8 is an enlarged central sectional view through my modified form of freezing tray.

Fig. 9 is an end view of the tray shown in Fig. 8 with the housing cover removed.

Fig. 10 is a fragmentary section taken on line 10—10 of Fig. 9, and

Fig. 11 is a wiring diagram of my modified form.

Referring to the drawings by reference characters I have indicated my invention as designed for use with an iceless refrigerator indicated generally at 10. This refrigerator is preferably electrically operated and may be of any desired character including a freezing compartment 12. As is customary with refrigerators of this type the freezing compartment 12 contains shelves 60 13 on which material to be frozen may be placed.

According to my invention I arrange on the lower shelf 13 a container 14 in which is adapted to contain a substance for making ice cream or similar product. As shown the container 14 has an open top which may be closed by a lid 15. For retaining the container in position on the shelf 13 I provide at the forward end of the container a hooked member 16 which is adapted to hook under the forward end of the shelf 13 and at the rear of the container I provide a flange 17 which is adapted to be positioned under a raised lip 18 upstruck from the shelf.

Mounted in the container 14 I provide a pair of stirring devices 20 each of which includes a shaft 21 having hubs 22 secured thereto which include radial arms 23 for supporting a helical beating member 24. At the forward end of the container I provide bearing members 25 for supporting the shafts 21 and adjacent the rear end of the container the shafts 21 include enlarged portions 26 which are positioned in packing gland bearing members 27 provided on the end of the container. The enlarged portions 26 of the shafts 21 terminate in polygonal end portions 28.

Built in the freezing compartment 12 to the rear of the container 14 I provide a housing 29 in which an electric motor 30 is positioned which may be operably connected to a source of electric energy in any desired manner. Secured to the armature shaft of the motor 30 I provide a gear 31 which meshes with a pair of gears 32 which are positioned one on each side of the gear 31 and are each secured to a shaft 33 mounted in a bearing member 34. Also secured to each of the shafts 33 I provide a gear 35 which meshes with a gear 36 rotatably supported by the bearing member 34. The gears 36 each include an enlarged hub 37 having a polygonal recess 38 therein of a size to receive the polygonal end portions 28 of the shafts 21 (see Fig. 5). Each of the polygonal end portions 28 of the shafts 21 includes a spring pressed ball snap connection device 39, the ball of which is adapted to engage an annular recess 40 provided in the hub 37 of the gear 36.

From the foregoing it will be apparent that when the motor 30 is started it will rotate the shafts 21 of the stirring members through the medium of the gear train just described.

For controlling the motor 30 I provide an overload switch 42 which may be of any desired type including a reset lever 43. I preferably use the overload switch 42 also as a starting switch.

For actuating the reset lever 43 I provide a push rod 44 which is preferably rectangular in cross section and is slidably mounted in a bearing 45. Adjacent the rear of the push rod 44 I pivotally mount thereon a finger 46 which is resiliently retained in a raised position by a spring 47.

To limit the upward movement of the finger 46 I provide a stop 48 on the rod 44. Secured to the rear wall of the refrigerator just past the point of throw of the reset lever 43 I provide a member 49 having an inclined cam face 50. At the forward end of the push rod 44 I provide an enlarged head 51 and surrounding the rod 44 between the head 51 and the bearing 45 I provide a coiled spring 52 which resiliently urges the push rod 44 forwardly. For limiting the forward movement of the push rod 44 I provide on the rod a collar 53.

When it is desired to freeze a substance in the container 14 the container is removed from the refrigerator, filled with the desired ingredients and replaced in the refrigerator compartment 12 in an operative position. As the container 14 is moved rearwardly the polygonal portions 28 of the shafts 21 enter the polygonal recesses of the gears 36 and at the same time the end of the container engages the end of the push rod 44 and moves it rearwardly.

As the rod 44 moves rearwardly the end of the finger 46 engages the reset lever 43 adjacent the lower end thereof and swings it rearwardly about its pivotal point. When the reset lever reaches the point where it resets the overload switch 42 the end of the lever 43 has swung up out of the path of the finger 46. As the finger 46 continues to move rearwardly it engages the cam surface 50 of the member 49 and is swung downwardly as shown in Fig. 2.

When the overload switch 42 is reset it starts the motor 30 which drives the stirring device as previously described.

When the viscosity of the substance being frozen in the container 14 reaches a certain point where an excessive strain is placed on the motor 30 the overload switch 42 throws out thereby stopping the motor 30 and the action of the stirring device 20.

When the overload switch 42 throws out it moves the reset lever 43 from the full line position shown in Fig. 2 to the dotted line position and when the container 14 is removed from the refrigerator the finger 46 moves under the end of the reset lever until it reaches its forward position where the spring 47 moves it upward to its initial position wherein it can again engage the reset lever.

In Figs. 6 to 11 inclusive I have shown a modified form of my invention. In Fig. 6 I have shown an iceless refrigerator 55 embodying the features of my modification. The refrigerator 55 may be of any desired type including a freezing compartment 56 and an electric motor 57 for actuating the freezing unit of the refrigerator, the compressing pump of which I have indicated at 58. As is well known in this type of refrigerator the actuation of the electric motor is controlled by a thermoresponsive switch which I have indicated generally at 59 in the diagram shown in Fig. 11.

As is customary with refrigerators of this type the freezing compartment 56 contains shelves 60 on which material to be frozen may be placed. As shown I removably position on the lower shelf 60 a container 62 which is adapted to hold a substance for making ice cream or other frozen products. The container 62 includes a reservoir section 63 and a gear housing section 64. Positioned in the reservoir sections 63 of the container I provide a plurality of stirring members 65 each of which includes a shaft 66 having hubs 67 secured thereto which include radial arms 68 supporting a helical mixing device 69. On the forward end of the container 62 I provide bearing members 70 in which the shafts 62 are rotatably positioned and at the rearward end the shafts are positioned in packing gland bearing members 71 and extend into the housing section 64.

Positioned in the housing 64 I provide a drive pinion gear 72 which is secured to a shaft 73 rotatably mounted in a bearing 74. The gear 72 includes a hub 75 which is rotatably supported in a bearing 76 and includes a polygonal recess 77. The gear 72 meshes with a pair of gears 78 which are secured to the shafts 66 and positioned one on each side of the gear 72.

For driving the pinion gear 72 I provide a flexible shaft which may be of any desired type including a power shaft 75, terminating in a power take off member 76 and with a flexible casing 77 over the power shaft 75. As shown the power take off end member 76 is provided with a reduced polygonal portion 78 which includes a spring pressed ball snap connection 79 similar to the one shown in Fig. 5 and previously described.

The end portion 78 of the power take off is adapted to be positioned in the polygonal recess 77 of the gear 72 to thereby drive the same when the shaft 75 is rotated. The shaft 75 extends to adjacent the freezing unit motor 57 where it is suitably connected as at 80 to a shaft 81 which is supported in bearings 82 and has a gear 83 secured thereto. The gear 83 is adapted to mesh with a gear 84 which is slidably mounted on a shaft 85 supported in bearings 86.

For shifting the gear 84 into and out of mesh with the gear 83 I provide a shifting lever 87 which is pivoted intermediate its length as at 88. One end of the lever 87 is slackly connected to the hub of the gear 84 and the opposite end extends through a slot 89 provided in the front of the refrigerator housing. One end of a coiled spring 90 is secured to the lever adjacent the gear 84 and the opposite end thereof is anchored to the refrigerator housing at a point intermediate the travel of the lever so that when the lever is moved past the center of its throw the spring will snap it past over the center and retain it in position.

The gear 84 when shifted into mesh with the gear 83 is adapted to mesh with a gear 91 provided on the armature shaft of the motor 57.

From the foregoing it will be apparent that when the motor 57 is started and the gear 84 is shifted into mesh with the gears 91 and 83 the flexible power shaft 75 will be rotated and will in turn rotate the drive gear 72 which will rotate the stirring devices 65 through the medium of the gears 78.

As shown in Fig. 11 one side of the motor 57 is connected to one side of a suitable source of power which is shown as a battery 93 by a wire 94. The opposite side of the motor 57 is connected by a wire 95 to a contact 96 which has a companion contact 97 connected by a wire 98 to one contact 99 of the thermoresponsive control switch 59. The other contact 100 of the switch 59 is connected by a wire 101 to the other side of the battery 93. As shown the contacts 99 and 100 of the switch 59 are adapted to be bridged by a contact bar 102 on a thermoresponsive arm 103.

The contacts 96 and 97 are adapted to be bridged by a contact bar 105 positioned on one side of the lever 87 and a contact bar 106 on the opposite side of the lever is adapted to bridge a pair of contacts 107 and 108 when in another position. The contact 107 is connected by a wire 109 to the wire 101.

The contact 108 is connected by a wire 110 to one contact of an overload switch 112 associated with the motor 57. The other contact of the overload switch 112 is connected by a wire 113 to the wire 94.

Adjacent the gear 84 I provide a solenoid coil 115 which has a core 116 associated therewith which is connected to the lever 87. One end of the coil 115 is connected by a wire 117 to the wire 94 and the opposite end of the coil 115 is connected by a wire 118 to a contact 119 which has a companion contact 120 connected by a wire 121 to a contact 122 which has a companion contact 123 connected by a wire 124 to the wire 109.

The contacts 119 and 120 are adapted to be bridged by a contact bar 125 on the core 116 and the contacts 122 and 123 are adapted to be bridged by a contact bar 126 on the reset lever 127 of the overload switch 112.

When it is desired to freeze ice cream in the tray 62 the tray is removed from the freezing compartment 56, the desired substance placed therein and the tray again positioned in the freezing compartment. The operator then connects the end of the flexible shaft 75 to the drive gear as previously described. The operator then moves the lever 87 to shift the gear 84 into mesh with the gear 83 thereby breaking the contact between the contacts 96 and 97 and moving the contact bar 106 into position to bridge the contacts 107 and 108. When the contact between the contacts 96 and 97 is broken the effect of the thermoresponsive switch 59 on the motor 57 is nullified. The operator then shifts the overload lever 127 to the position shown in Fig. 11 to reset the overload switch 112.

When the levers 87 and 127 are in this position the current from the battery 93 flows through the wires 101 and 109 to the contact 107, through the contact bar 106 to the contact 108 and thence through the wire 110 to the overload switch 112. From the overload switch 112 the current passes through the motor 57 and thence back through the overload switch and the wire 113 to the wire 94 and thence back to the battery 93 thereby operating the motor 57.

When the viscosity of the material being frozen in the tray 62 reaches a certain point where an excessive strain is put on the motor 57 the overload switch 112 throws out thereby stopping the motor 57. When the overload switch 112 throws out the reset lever 127 thereof moves to a position wherein the contact bar 126 on the reset lever bridges the contacts 122 and 123 whereupon the current from the battery flows through wires 101, 109 and 124 to the contact 123, through the contact bar 126 to the contact 122 and thence through the wire 121 to the contact 120. The current then flows through the contact bar 125 on the solenoid core 116 to the contact 119 and thence through the wire 118 to the solenoid core 115, through the core and thence back to the battery through the wires 117 and 94.

As the current passes through the solenoid coil 115 it energizes the same whereupon the core 116 is attracted thereinto thereby swinging the lever 87 about its pivot. After the lever 87 passes its center point the spring continues to move it and as it so moves the contact bar becomes disengaged from the contacts 107 and 108 thereby breaking the circuit to the coil 115. As the lever is thus moved the gear 84 is moved out of mesh with the gears 82 and 85 whereupon the flexible shaft 75 ceases to rotate. At the same time the contact bar 106 is moved out of engagement with the contacts 107 and 108 and the contact bar 105 is moved into engagement with the contacts 122 and 123 thereby reestablishing the circuit from the battery through the thermoresponsive switch 59 to the motor 57 whereafter the switch 59 will actuate upon the rise and fall of temperature in the refrigerator to start and stop the motor 57.

From the foregoing description it will be apparent that I have provided a novel ice cream freezing device which is simple in construction and highly efficient in use.

Having thus described my invention, what I claim is:

1. In combination with an iceless refrigerator including an electric motor for actuating the freezing mechanism, a container, a stirring device in said container, means to drive said stirring device from said motor, said motor including an overload switch, a thermo-responsive switch for controlling the operation of said motor, means whereby when said stirring means drive means is set to operate the effect of said thermo-responsive switch on said motor will be cut out, means whereby when the viscosity of the substance being frozen in said container reaches a certain point said overload switch will cut off the supply of current to said motor and means whereby when said overload switch cuts out, said stirring drive means will cease to operate and the effect of said thermo-responsive switch on said motor will be reinstated.

2. In combination with an iceless refrigerator including an electric motor for actuating the freezing mechanism, a freezing compartment in said refrigerator, a container in said compartment, a plurality of rotatable stirring devices in said container, each of said stirring devices including a shaft, a gear on each of said shafts within said housing, a drive gear meshing with said stirring shaft gears, a flexible drive shaft, selective means to drive said flexible shaft drive means from said motor, a thermo-responsive switch for controlling the operation of said motor, an overload switch, means operated by the overload switch when the viscosity of the substance being frozen reaches a certain point to cut off the supply of current to the motor, to disengage said selective drive means and to place said thermo-responsive means in operation.

3. In combination with an iceless refrigerator including an electric motor for actuating the freezing mechanism, a freezing compartment in said refrigerator, a container removably mounted in said compartment, a housing in said container, a plurality of rotatable stirring devices in said container, each of said stirring devices including a shaft extending into said housing, a gear on each of said shafts within said housing, a drive gear rotatably mounted in said housing and meshing with said stirring shaft gears, a flexible drive shaft, separable connection means operably connecting said flexible shaft, selective means to drive said flexible shaft from said motor, said motor including an overload switch, a thermo-responsive switch for controlling the operation of said motor, means whereby when said selective drive means is set to drive said flexible shaft the effect of said thermo-responsive switch on said motor will be cut out, means whereby when the viscosity of the substance being frozen in said container reaches a certain point said overload switch will cut off the supply of current to said motor and means whereby when said overload switch cuts out said selective drive means will cease to drive said flexible shaft and the effect of said thermo-responsive switch on said motor will be reinstated.

4. In combination with an iceless refrigerator including an electric motor for actuating the freezing mechanism, a container, a stirring device in said container, means to drive said stirring device, a thermo-responsive switch for controlling the operation of said motor, means to cause said thermo-responsive switch to be ineffective to control the motor to stop the same, means operable when the viscosity of the substance being frozen in said container reaches a certain point to cause said drive to the stirring device to cease to operate and to cause said motor to be placed under control of said thermo-responsive switch.

MARTIN G. TORSON.